(12) United States Patent
Nagai et al.

(10) Patent No.: US 6,828,782 B2
(45) Date of Patent: Dec. 7, 2004

(54) SENSOR ATTACHMENT STRUCTURE FOR ATTACHING A FLEXIBLE SENSOR BY STICKING TO AN ACTUATOR BODY

(75) Inventors: Shigekazu Nagai, Tokyo (JP); Masaki Miyahara, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/232,716

(22) Filed: Sep. 3, 2002

(65) Prior Publication Data

US 2003/0042892 A1 Mar. 6, 2003

(30) Foreign Application Priority Data

Sep. 3, 2001 (JP) ........................................ 2001-266309

(51) Int. Cl.⁷ ................................................. G01B 7/14
(52) U.S. Cl. .................... 324/207.24; 324/262
(58) Field of Search .................. 324/207.2–207.24, 324/262; 92/5 R; 340/539.23

(56) References Cited

U.S. PATENT DOCUMENTS

| | | | | |
|---|---|---|---|---|
| 4,225,006 A | * | 9/1980 | Murray | ..................... 324/163 X |
| 4,359,657 A | * | 11/1982 | Matsumoto et al. | .... 324/174 X |
| 4,793,241 A | * | 12/1988 | Mano et al. | ..................... 92/5 R |
| 5,231,352 A | * | 7/1993 | Huber | .................... 324/207.24 |
| 5,333,535 A | | 8/1994 | Miyamoto et al. | |
| 5,523,681 A | * | 6/1996 | Hajzler et al. | ............... 324/174 |
| 5,617,819 A | * | 4/1997 | Dery et al. | ............. 324/173 X |
| 5,813,313 A | * | 9/1998 | Stoll et al. | ...................... 92/5 R |
| 6,089,111 A | | 7/2000 | Machijima | |
| 6,098,521 A | | 8/2000 | Iida | |
| 6,351,120 B2 | * | 2/2002 | Goldfine | ....................... 324/262 |
| 6,497,035 B1 | * | 12/2002 | Ratliff | ................. 324/207.2 X |

FOREIGN PATENT DOCUMENTS

| | | |
|---|---|---|
| DE | 35 07 167 C3 | 9/1986 |
| DE | 41 27 204 A1 | 2/1993 |
| DE | 42 41 189 A1 | 6/1994 |
| DE | 44 08 639 C2 | 9/1995 |
| DE | 198 40 876 A1 | 4/1999 |
| DE | 100 07 206 A1 | 7/2001 |
| EP | 0 676 550 B1 | 10/1995 |
| GB | 2 171 847 A | 9/1986 |
| GB | 2 259 611 A | 3/1993 |
| GB | 198 27 765 A1 | 1/1999 |
| JP | 3-31115 | 2/1991 |
| JP | 5-180299 | 7/1993 |

* cited by examiner

*Primary Examiner*—N. Le
*Assistant Examiner*—Darrell Kinder
(74) *Attorney, Agent, or Firm*—Paul A. Guss

(57) ABSTRACT

A sensor attachment structure is provided with grooves for attaching, to an actuator body, magnetism-detecting sensors each of which is constructed to have a substantially rectangular cross section. The groove is designed to have a substantially rectangular open cross section. The groove includes a tapered section which has widths gradually narrowed inwardly from the contour surface, and a spread section which is spread from narrow width ends of the tapered section and to which pawls of the magnetism-detecting sensor are installed.

14 Claims, 13 Drawing Sheets

SENSOR ATTACHMENT STRUCTURE FOR ATTACHING A FLEXIBLE SENSOR BY STICKING TO AN ACTUATOR BODY

BACKGROUND OF THE INVENTION

1. Field of the Invention

The present invention relates to a sensor attachment structure of an actuator body for attaching, to a predetermined portion of the actuator body, a sensor for detecting a position of a movable section which is movable with respect to the actuator body under the action of an actuator.

2. Description of the Related Art

An electric actuator has been hitherto used, in which a workpiece or the like, which is installed to a movable section, can be moved back and forth in a reciprocating manner, for example, by transmitting the rotary driving force of an electric motor to the movable section by the aid of a feed screw shaft to allow the movable section to make linear reciprocating motion in the axial direction of an actuator body.

Such an electric actuator is incorporated, for example, into automated assembling steps and machining steps. It is necessary to automatically detect whether or not the electric actuator performs desired operation in a reliable manner. Therefore, a variety of sensors are usually attached to the actuator body which constitutes the electric actuator to make control so that the operation of the electric actuator is confirmed on the basis of the detection signal supplied from the sensor.

For example, as shown in FIG. 15, the electric actuator 1 comprises an electric motor 2 and an actuator body 3 which is connected to the electric motor 2. The electric actuator 1 is constructed such that a rod (movable section) 4 is movable back and forth in a reciprocating manner in the axial direction of the actuator body 3 (direction of the arrow A) under the driving action of the electric motor 2. In order to detect the reciprocating movement position of the rod 4, for example, the following structure is known. That is, an unillustrated magnet is installed to the rod 4, and a magnetism-detecting sensor (automatic switch) 5 is installed to a predetermined portion of the actuator body 3.

The magnetism-detecting sensor 5 is integrally composed of a main body section 5a having a substantially circular cross section, and a projection 5b having a substantially rectangular cross section. Sensor attachment grooves 6, which extend in the axial direction, are formed on respective surfaces or on a predetermined surface of the actuator body 3 for attaching the magnetism-detecting sensor 5. Each of the grooves 6 includes a circular groove 6a which has a substantially circular open cross section corresponding to the main body section 5a of the magnetism-detecting sensor 5, and a rectangular groove 6b which has a rectangular cross section, with one end communicating with the circular groove 6a and the other end being open to the outside.

However, in the case of the conventional technique as described above, the groove 6, which is formed on the surface of the actuator body 3, includes the circular groove 6a and the rectangular groove 6b corresponding to the shape of the magnetism-detecting sensor 5. The depth H of the groove 6 has a relatively large dimension extending inwardly from the contour surface of the actuator body 3. For this reason, the lateral dimension and the vertical dimension of the actuator body 3 are considerably large, due to the provision of the grooves 6. It is impossible to realize a compact size and a light weight of the overall actuator body 3.

Further, when the magnetism-detecting sensor 5 is installed to the actuator body 3, the following operation is required. That is, the magnetism-detecting sensor 5 is inserted into each of the grooves 6 from the end of the actuator body 3 (on the side of the rod 4), and then the magnetism-detecting sensor 5 is arranged at a predetermined position in the axial direction of the actuator body 3.

For this reason, it is necessary to use a relatively large space on the side of the rod 4 in order to attach and detach the magnetism-detecting sensor 5. It is difficult to effectively utilize a narrow space, and the operability to attach the magnetism-detecting sensor 5 is inferior.

SUMMARY OF THE INVENTION

A general object of the present invention is to provide a sensor attachment structure of an actuator body which effectively miniaturizes the actuator body with ease and which is excellent in operability to attach a sensor.

According to the present invention, a sensor is constructed to have a substantially rectangular cross section (thin shape), and the sensor is provided with a projection at an attachment end thereof, in which the projection protrudes outwardly. On the other hand, a sensor attachment groove, which has a substantially rectangular open cross section, is provided on a contour surface of an actuator body. The groove includes a tapered section which has widths gradually narrowed inwardly from the contour surface, and a spread section which is spread from narrow width ends of the tapered section and to which the projection of the sensor is installed.

Accordingly, the groove, which is provided on the contour surface of the actuator body, is designed to have a thin shape. It is possible to greatly reduce the dimension in the depth direction as compared with the conventional structure provided with the groove having the circular open cross section. Therefore, the contour dimension of the actuator body is effectively reduced. It is possible to realize a compact size and a light weight of the overall actuator body with ease.

When the sensor is attached to the groove, then the sensor is arranged at a predetermined position of the actuator body, and the sensor is pressed inwardly toward the groove. Accordingly, the sensor is easily inserted into the groove under the guiding action of the tapered section which constitutes the groove. When the projection of the sensor is installed to the spread section which is spread from the narrow width ends of the tapered section, then the sensor is reliably accommodated and secured in the groove, and thus the sensor is attached to the predetermined position of the actuator body. Accordingly, the operability to attach the sensor is effectively improved.

Further, when the sensor is composed of a flexible board which is formed to have a sheet-shaped configuration, a sensor attachment recess has an extremely minute depth. Alternatively, the sensor, which is composed of the flexible board having the sheet-shaped configuration as described above, may be directly stuck to an outer surface of an actuator body which is formed with no sensor attachment recess or the like at all, by using a sticking member.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
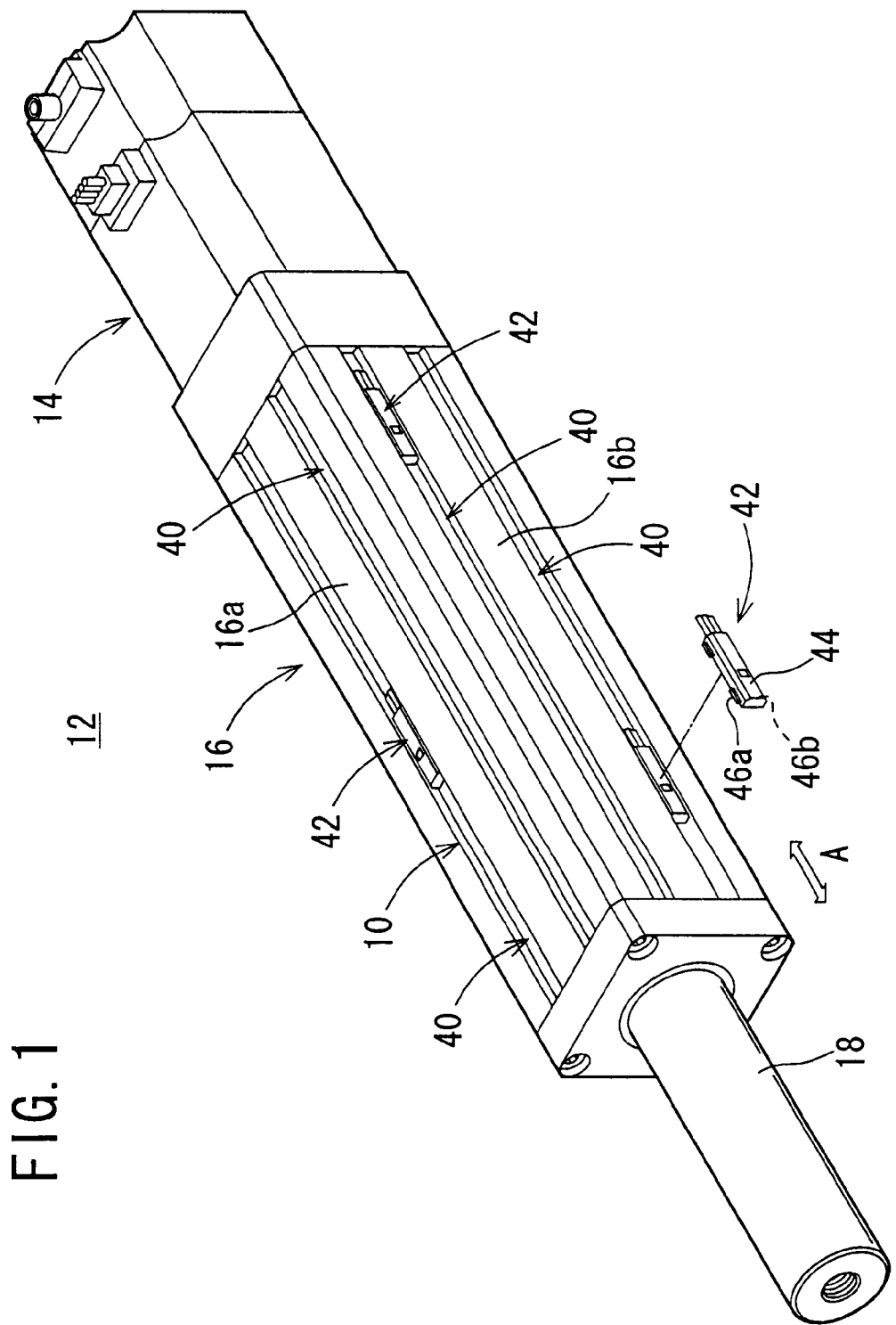
FIG. 1 is a schematic perspective view illustrating an electric actuator into which a sensor attachment structure according to a first embodiment of the present invention is incorporated.

FIG. 1 shows an electric actuator 12 into which a sensor attachment structure 10 according to a first embodiment of the present invention is incorporated.

The electric actuator 12 comprises an electric motor (actuator) 14, and an actuator body 16 having one end to which the electric motor 14 is connected. A rod section (movable section) 18, which is movable in the axial direction (direction of the arrow A) under the action of the electric motor 14, is accommodated in the actuator body 16 so that the rod section 18 is movable back and forth in a reciprocating manner.

Figure 2:
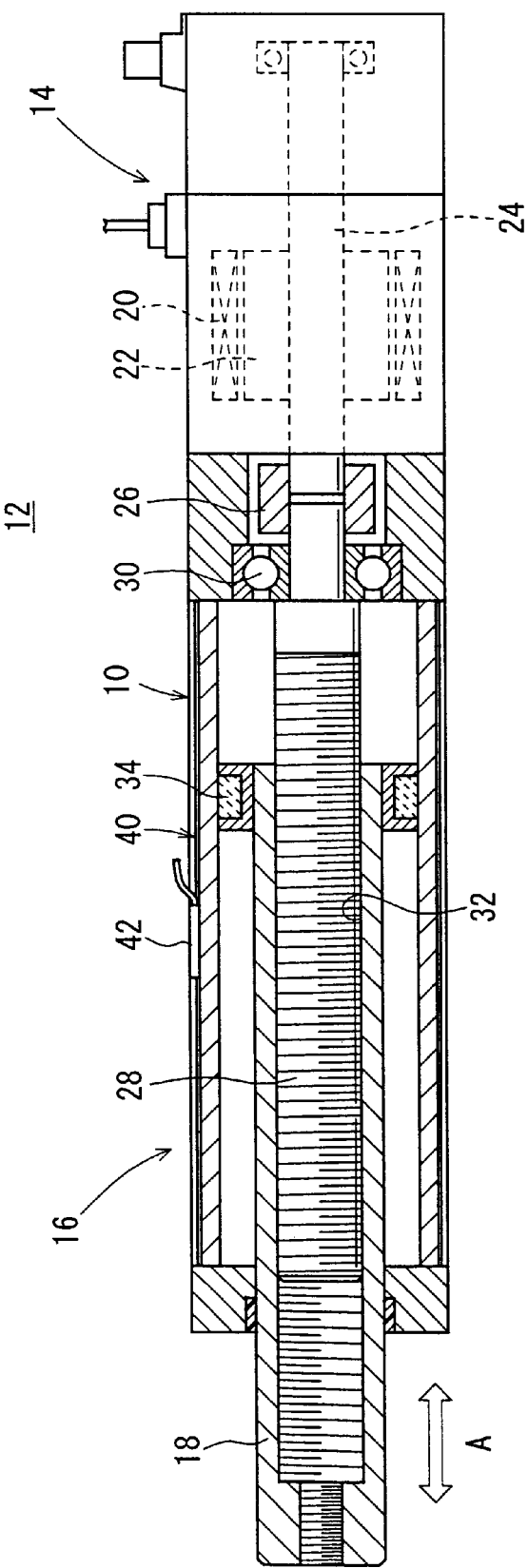
FIG. 2 is a partial longitudinal sectional view taken along the axial direction of the electric actuator shown in FIG. 1.

As shown in FIG. 2, the electric motor 14 includes a motor shaft 24 which is driven and rotated by the aid of an electromagnetic coil 20 and a magnet 22. A feed screw shaft 28 is coaxially connected to one end of the motor shaft 24 by the aid of a coupling member 26. The feed screw shaft 28 is rotatably supported in the actuator body 16 by the aid of a bearing 30. The rod section 18 is screw-engaged with the forward end of the feed screw shaft 28.

The rod section 18 is constructed to have a cylindrical shape. A screw hole 32, which is screw-engaged with the feed screw shaft 28, is formed on the inner circumferential surface of the rod section 18. A permanent magnet (magnetism-generating source) 34 is installed to an inward end of the rod section 18. The permanent magnet 34 is movable in the direction of the arrow A in the actuator body 16 integrally with the rod section 18.

Figure 3:
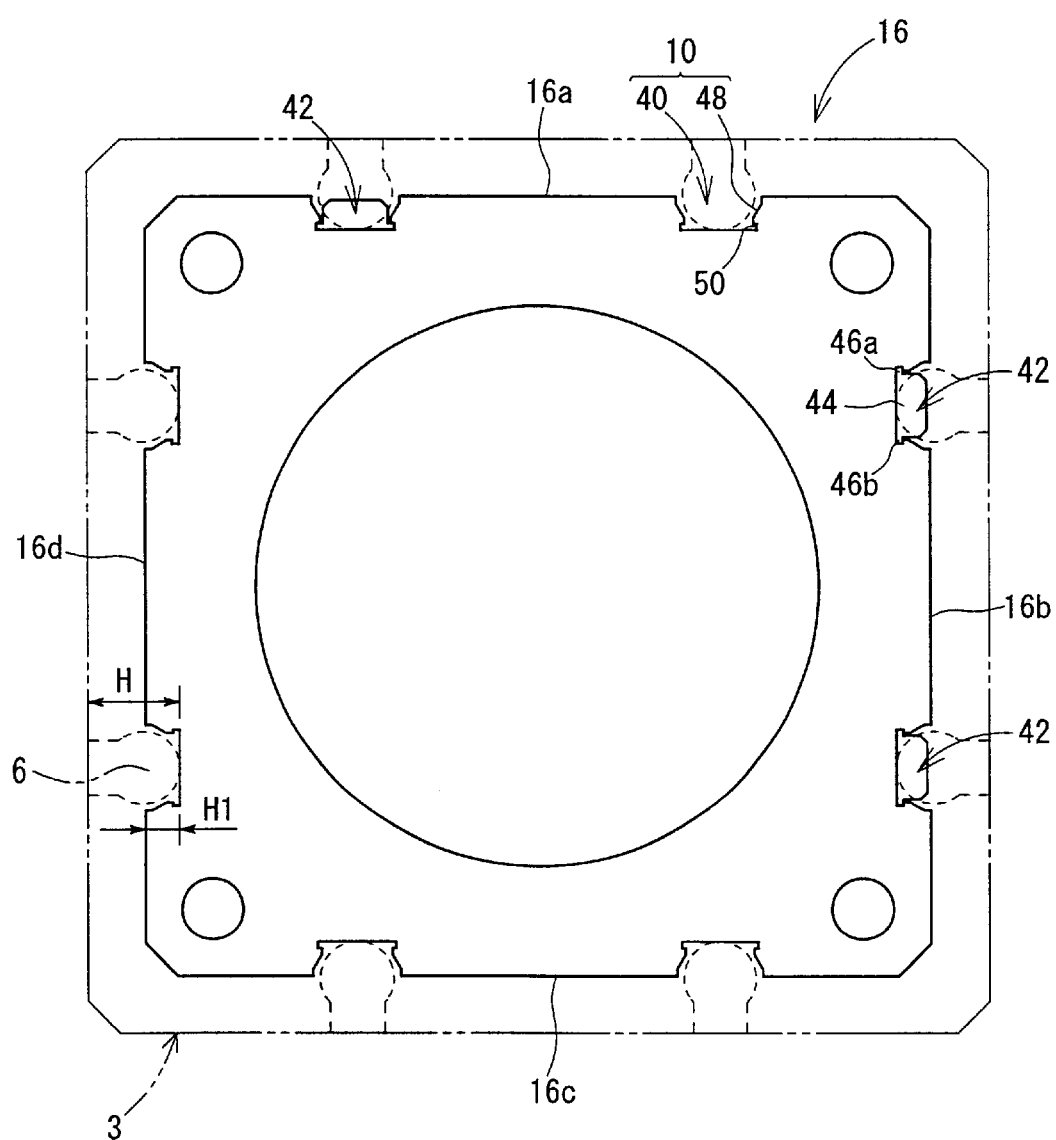
FIG. 3 is a front view illustrating an actuator body of the electric actuator shown in FIG. 1.

As shown in FIGS. 1 to 3, two sensor attachment grooves 40 of the sensor attachment structure 10 extend in parallel to one another on each of side surfaces 16a to 16d of the actuator body 16 in the circumferential direction. A sensor, for example, a magnetism-detecting sensor 42, which is attached to each of the grooves 40, is provided with a main body section 44 having a substantially rectangular cross section. A pair of pawls (projections) 46a, 46b, which protrude outwardly and which have the elasticity respectively, are provided on the attachment end of the main body section 44. The pair of pawls 46a, 46b are composed of, for example, a material based on resin.

As shown in FIG. 3, the groove 40 has a tapered section 48 which has widths gradually narrowed inwardly from the contour surface of the actuator body 16, and a spread section 50 which is spread from the narrow width ends of the tapered section 48 and to which the pawls 46a, 46b of the magnetism-detecting sensor 42 are installed. For example, three magnetism-detecting sensors 42 are attached to two grooves 40 provided on one vertical surface and to one groove 40 provided on the upper surface of the actuator body 16 at predetermined positions respectively.

The operation of the electric actuator 12 constructed as described above will be explained below.

When the electric power is applied to the electromagnetic coil 20 of the electric motor 14 as shown in FIG. 2, for example, after an unillustrated workpiece or a tool is installed to the forward end of the rod section 18, the motor shaft 24 is rotated under the action of the electromagnetic coil 20 and the magnet 22. The rotation of the motor shaft 24 is transmitted to the feed screw shaft 28 by the aid of the coupling member 26. The rod section 18, which is screw-engaged with the feed screw shaft 28, makes reciprocating motion in the axial direction of the actuator body 16 (in the direction of the arrow A).

During this process, the permanent magnet 34 is moved in the direction of the arrow A integrally with the rod section 18. The three magnetism-detecting sensors 42, which are arranged at the predetermined positions, detect the magnetic field generated by the permanent magnet 34. Accordingly, it is possible to detect, for example, the forward movement end position, the backward movement end position, and the intermediate position of the rod section 18 automatically and reliably.

In this case, in the first embodiment, as shown in FIG. 3, the actuator body 16 is provided with the grooves 40 each of which has the substantially rectangular open cross section corresponding to the magnetism-detecting sensor 42 constructed to have the substantially rectangular cross section. Therefore, the depth H1 of the groove 40 is designed to have a relatively small dimension extending inwardly with respect to the actuator body 16. The wall thickness is very small as compared with the depth H of the groove 6 which is provided for the conventional actuator body 3.

Accordingly, the contour dimension of the actuator body 16 is greatly reduced as compared with the conventional actuator body 3, and the overall actuator body 16 has a small size and a light weight.

Further, in the first embodiment, the groove 40 has the tapered section 48 having the widths which are gradually narrowed inwardly. When the magnetism-detecting sensor 42 is pressed against the groove 40, the magnetism-detecting sensor 42 is inserted inwardly into the groove 40 easily and smoothly under the guiding action of the tapered section 48. Therefore, the magnetism-detecting sensor 42 can be easily attached to the desired position by reliably inserting the magnetism-detecting sensor 42 into the groove 40 by only pressing the magnetism-detecting sensor 42 toward the inside of the groove 40 in a state in which the magnetism-detecting sensor 42 is previously arranged at the predetermined position on the actuator body 16.

Accordingly, the operation to attach the magnetism-detecting sensor 42 is simplified. Further, for example, it is unnecessary to slide the magnetism-detecting sensor 42 to the predetermined position after inserting the magnetism-detecting sensor 42 into the groove 40 from the end of the actuator body 16 (on the side of the rod section 18). Thus, the space for performing the attachment operation is not enlarged.

In the first embodiment, the inner circumferential surface of the actuator body 16 may have a circular open cross section. Alternatively, the inner circumferential surface of the actuator body 16 may be designed to form a spline hole having the rotation-preventive function.

Figure 4:
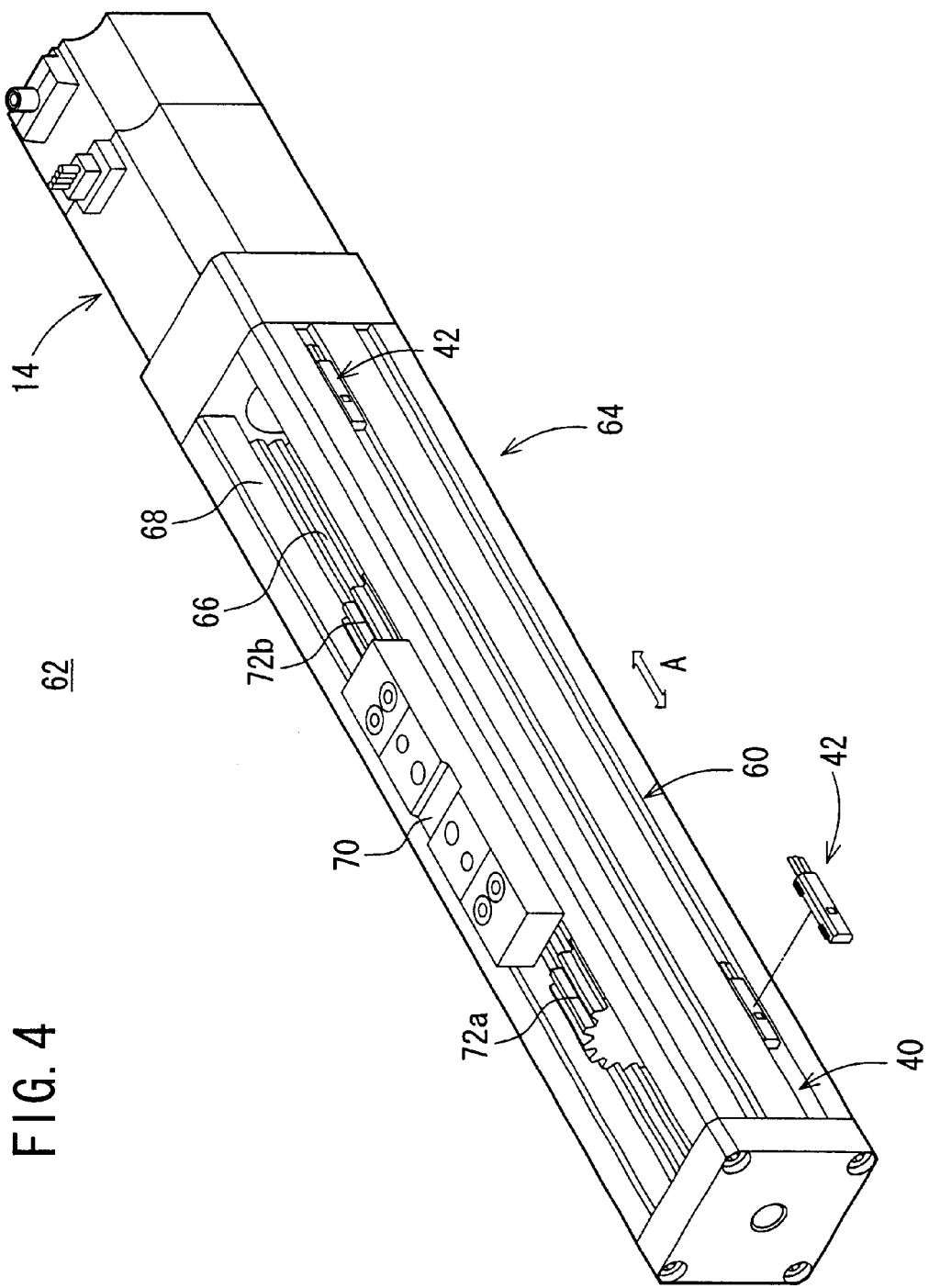
FIG. 4 is a schematic perspective view illustrating an electric actuator into which a sensor attachment structure according to a second embodiment of the present invention is incorporated.

Next, FIG. 4 shows an electric actuator 62 into which a sensor attachment structure 60 according to a second embodiment of the present invention is incorporated. The constituent elements that are identical to those of the electric actuator 12 according to the first embodiment are labeled with the same reference numeral, and description thereof is omitted.

Figure 5:
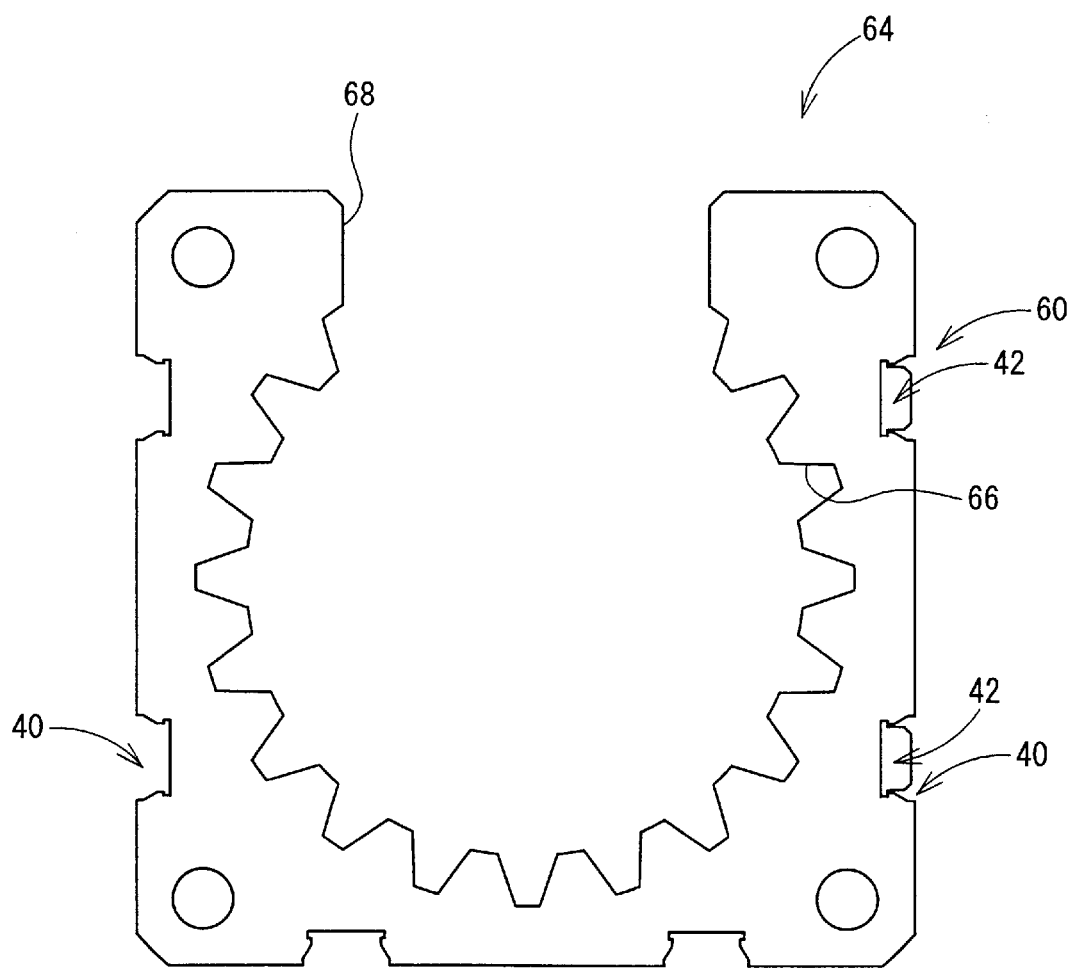
FIG. 5 is a front view illustrating an actuator body of the electric actuator shown in FIG. 4.

The electric actuator 62 is provided with an actuator body 64. A spline hole 66 is formed in the actuator body 64. An upper portion of the spline hole 66 communicates with the outside via an opening 68 (see FIG. 5). A movable table (movable section) 70 is arranged corresponding to the opening 68. A pair of spline shafts 72a, 72b, which are fixed to the front and rear ends of the movable table 70, are screw-engaged with the spline hole 66. Therefore, the movable table 70 is movable back and forth in a reciprocating manner in the direction of the arrow A under the rotary action of the electric motor 14 while maintaining a predetermined posture.

In the electric actuator 62 of the table type constructed as described above, two magnetism-detecting sensors 42 are attached to one vertical surface of the actuator body 64 corresponding to the frontward movement end position and the backward movement end position of the movable table 70. Grooves 40 for attaching the magnetism-detecting sensors 42 are designed to have a substantially rectangular open cross section. Therefore, the effect equivalent to that obtained in the first embodiment is obtained, for example, such that the overall actuator body 64 has a compact size and a light weight with ease.

Figure 6:
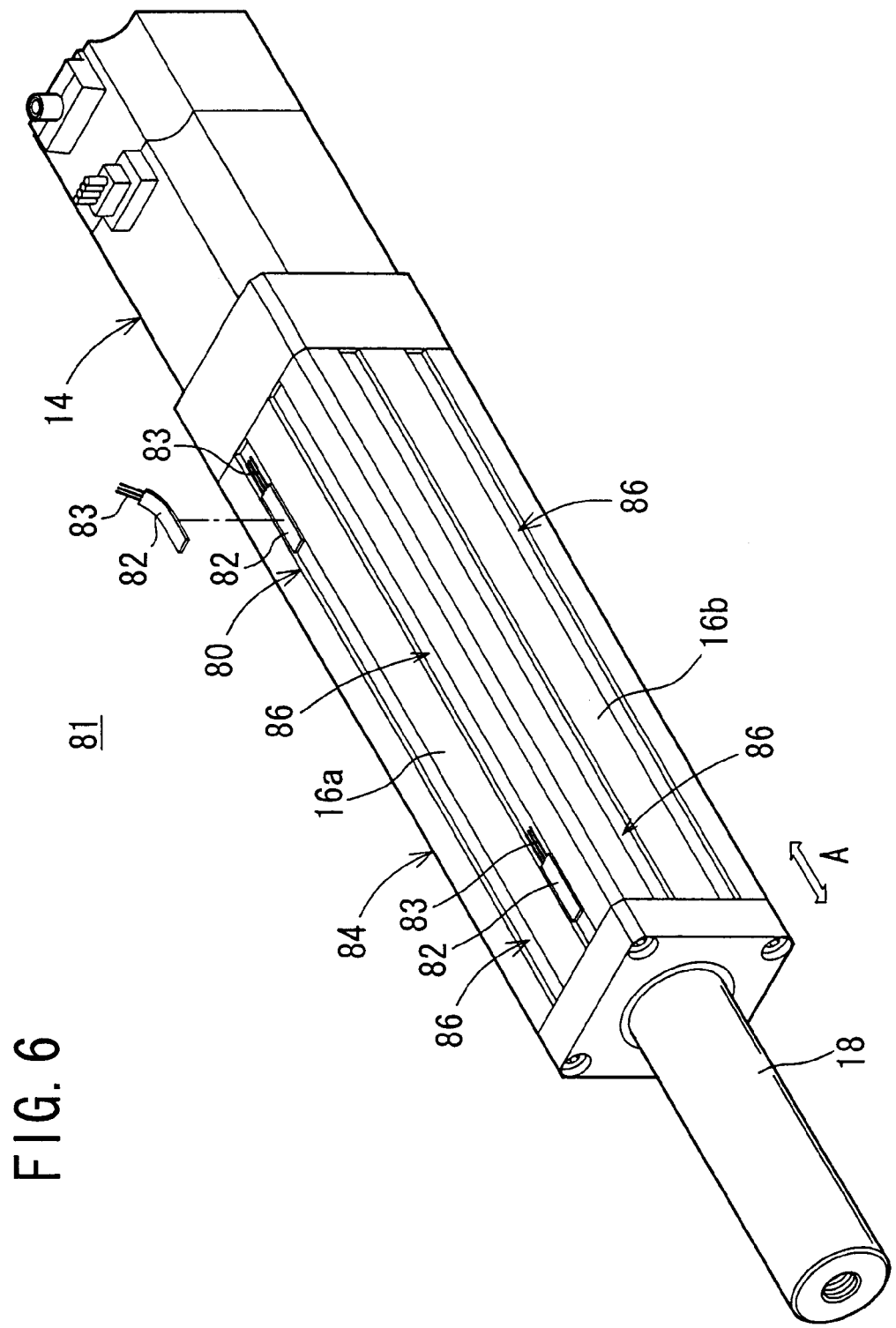
FIG. 6 is a schematic perspective view illustrating an electric actuator into which a sensor attachment structure according to a third embodiment of the present invention is incorporated.

Next, FIG. 6 shows an electric actuator 81 into which a sensor attachment structure 80 according to a third embodiment of the present invention is incorporated.

Figure 7:
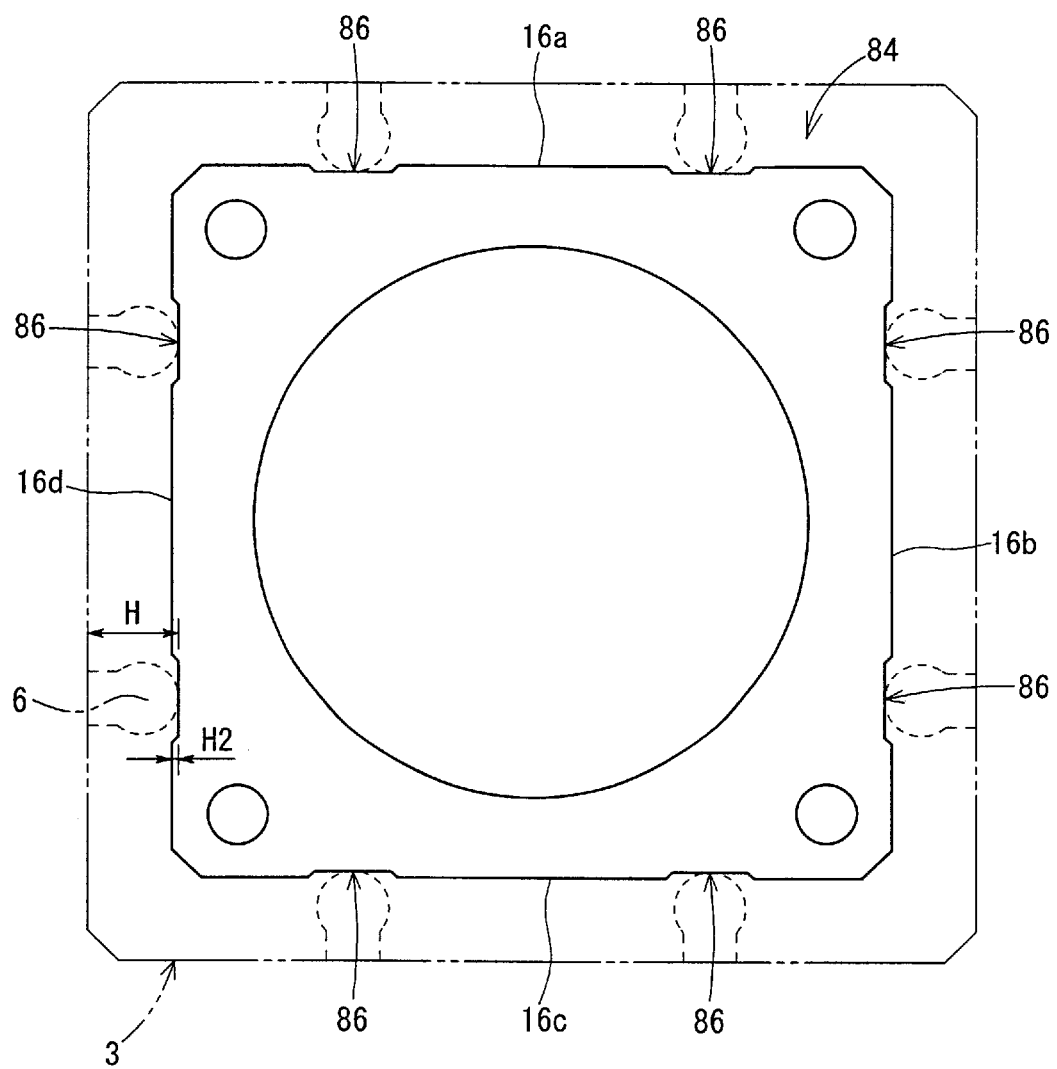
FIG. 7 is a front view illustrating an actuator body of the electric actuator shown in FIG. 6.

The sensor attachment structure 80 according to the third embodiment includes a magnetism-detecting sensor 82 which is composed of a flexible board formed to have a sheet-shaped configuration. Lead wires 83 are electrically connected to the flexible board. Sensor attachment recesses 68, each of which corresponds to the shape of the magnetism-detecting sensor 82 composed of the sheet-shaped flexible board, are formed in parallel to one another in the axial direction on the side surfaces of the actuator body 84. As shown in FIG. 7, the depth H2 of the sensor attachment recess 86 is formed to be extremely minute corresponding to the wall thickness of the sheet-shaped configuration of the magnetism-detecting sensor 82.

Figure 8:
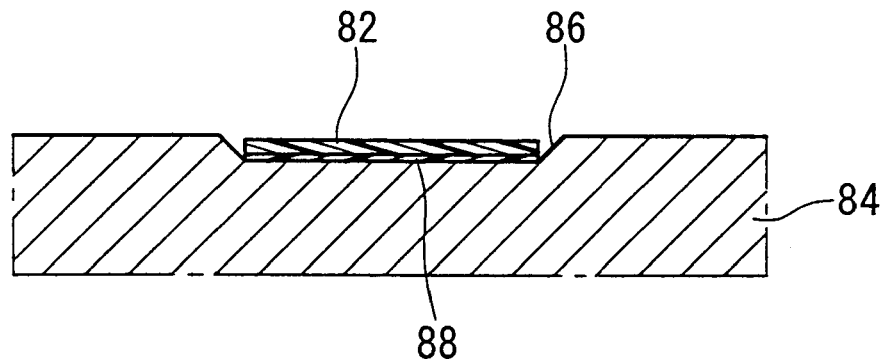
FIG. 8 is a partial magnified vertical sectional view illustrating a state in which a sheet-shaped magnetism-detecting sensor is stuck to a sensor attachment recess by using a double-sided adhesive tape.

In this arrangement, as shown in FIG. 8, the sheet-shaped magnetism-detecting sensor 82 can be stuck to an arbitrary portion of the sensor attachment recess 86 by using a so-called double-sided adhesive tape (sticking member) 88 composed of a strip-shaped flexible sheet member having adhesive surfaces on both front and back sides thereof.

Figure 9:
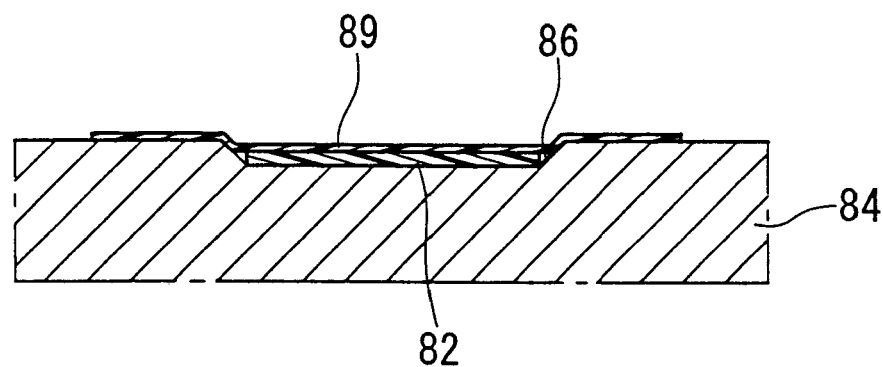
FIG. 9 is a partial magnified vertical sectional view illustrating a state in which the sheet-shaped magnetism-detecting sensor is covered with a single-sided adhesive tape on the contour surface side of an actuator body.

Alternatively, as shown in FIG. 9, the magnetism-detecting sensor 82 may be fastened in the sensor attachment recess 86 by covering the magnetism-detecting sensor 82 on the side of the contour surface of the actuator body 84 by using a single-sided adhesive tape (sticking member) 89 composed of a strip-shaped flexible sheet member having an adhesive surface on only one side of front and back sides thereof.

In the third embodiment, as shown in FIG. 7, the actuator body 84 is provided with the sensor attachment recesses 86 each corresponding to the shape of the sheet-shaped magnetism-detecting sensor 82. Accordingly, the depth H2 of the sensor attachment recess 86 is designed to have an extremely minute dimension extending inwardly with respect to the actuator body 84. The wall thickness is very small as compared with the depth H of the groove 6 provided for the actuator body 3.

Figure 10:
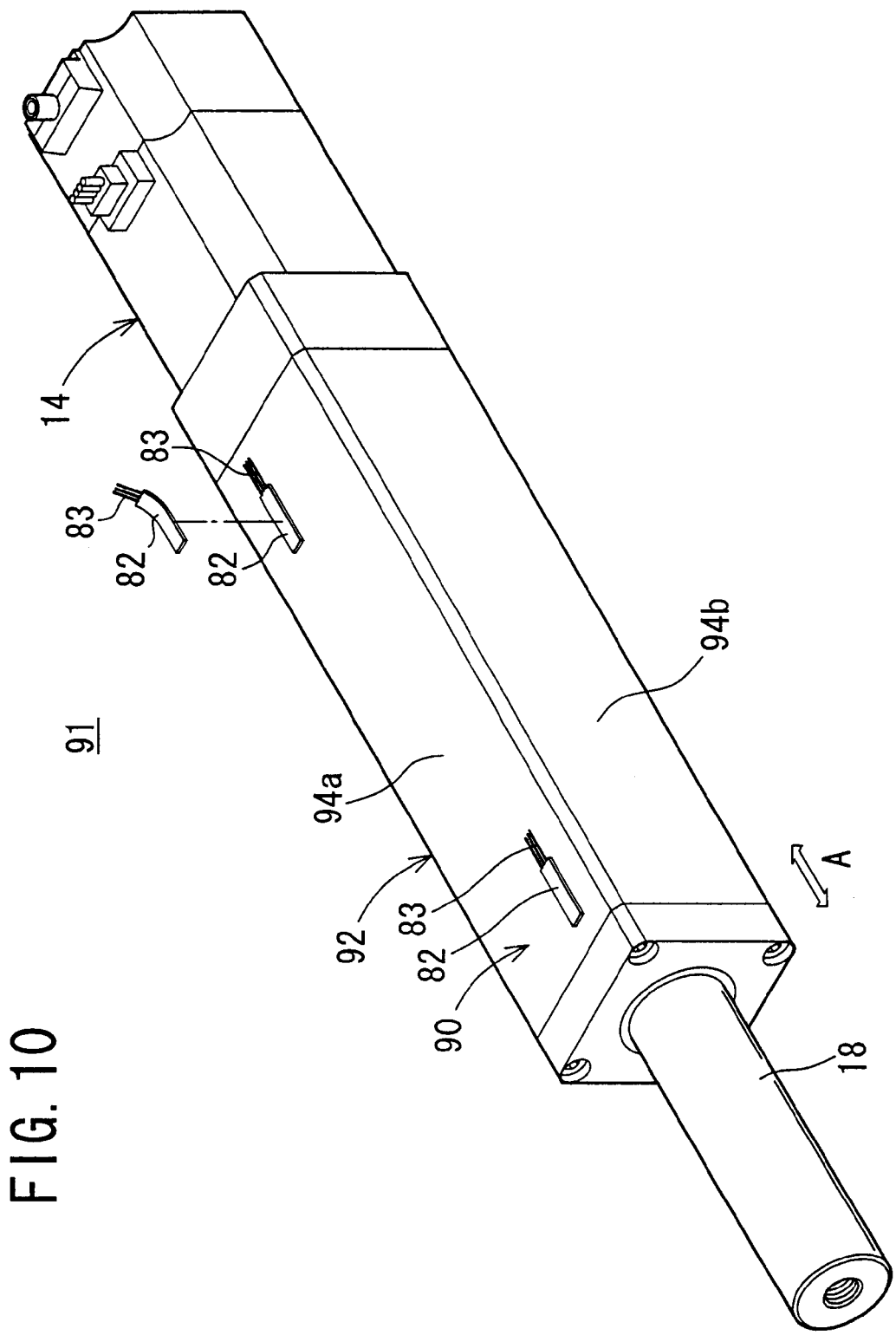
FIG. 10 is a schematic perspective view illustrating an electric actuator into which a sensor attachment structure according to a fourth embodiment of the present invention is incorporated.

Next, FIG. 10 shows an electric actuator 91 into which a sensor attachment structure 90 according to a fourth embodiment of the present invention is incorporated. The constituent elements that are identical to those of the sensor attachment structure 80 according to the third embodiment are labeled with the same reference numeral, and description thereof is omitted.

Figure 11:
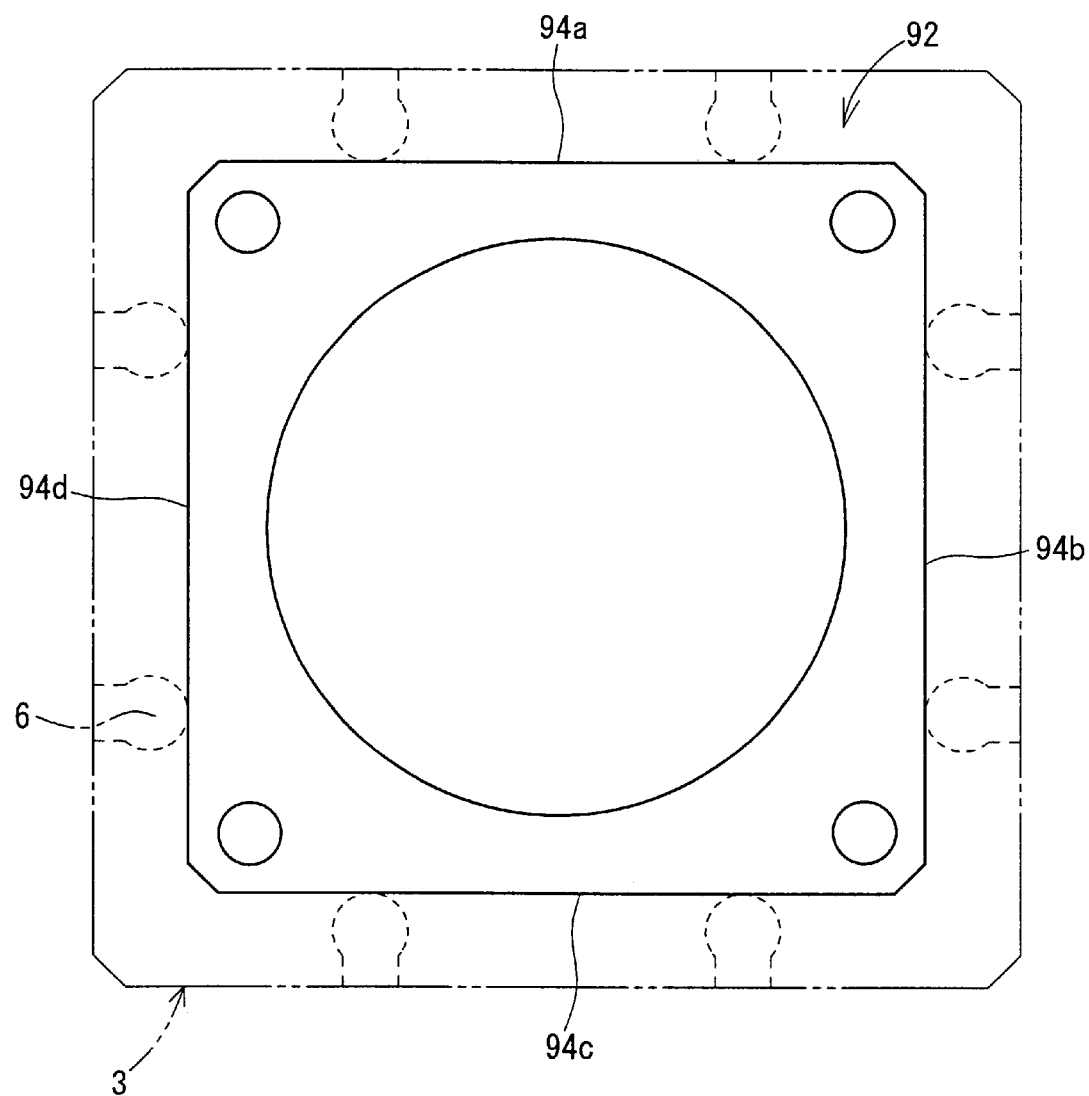
FIG. 11 is a front view illustrating an actuator body of the electric actuator shown in FIG. 10.

In the sensor attachment structure 90 according to the fourth embodiment, magnetism-detecting sensors 82, each of which is composed of a flexible board formed to have a sheet-shaped configuration, are stuck to a flat side surface 94a (94b to 94d) of an actuator body 92. As shown in FIG. 11, for example, neither groove nor recess for attaching the magnetism-detecting sensor 82 is formed at all on the actuator body 92. The magnetism-detecting sensor 82 is directly stuck to the side surface 94a (94b to 94d) as the flat outer surface of the actuator body 92.

Figure 12:
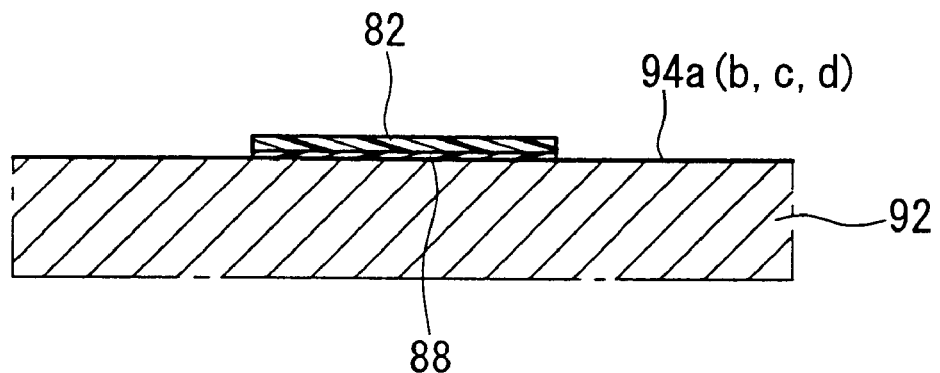
FIG. 12 is a partial magnified vertical sectional view illustrating a state in which a sheet-shaped magnetism-detecting sensor is stuck to an outer surface of an actuator body by using a double-sided adhesive tape.
Figure 13:
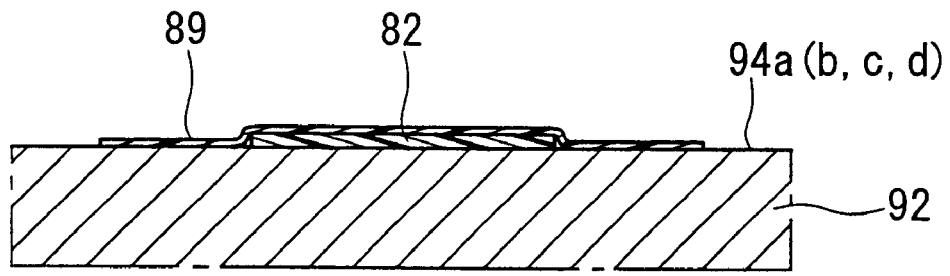
FIG. 13 is a partial magnified vertical sectional view illustrating a state in which the sheet-shaped magnetism-detecting sensor is stuck to the outer surface of the actuator body by using a single-sided adhesive tape.

In this embodiment, the magnetism-detecting sensor 82 may be directly stuck to the outer surface of the actuator body 92 by using a double-sided adhesive tape 88 composed of a strip-shaped flexible sheet member having adhesive surfaces on both front and back sides thereof, or a single-sided adhesive tape (sticking member) 89 having an adhesive surface on only one side thereof (see FIGS. 12 and 13).

In the sensor attachment structures 80, 90 according to the third and fourth embodiments of the present invention, the depth H2 of the sensor attachment recess 86 is extremely minute as compared with the conventional technique, or no sensor attachment recess 86 or the like is formed at all. Accordingly, it is possible to further improve the rigidity of the actuator bodies 84, 92 as compared with the actuator body 3 formed with the grooves 6.

Figure 14:
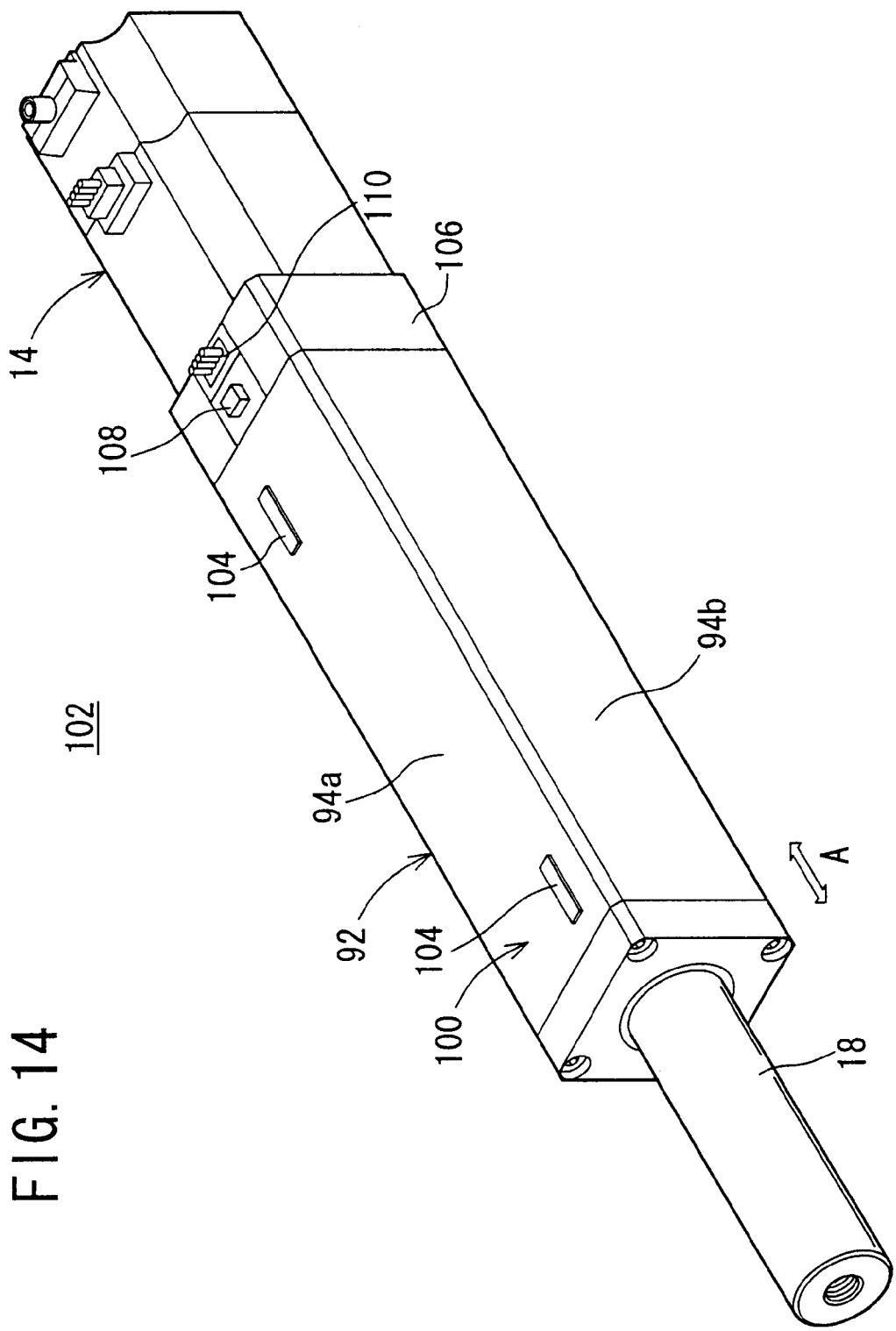
FIG. 14 is a schematic perspective view illustrating an electric actuator into which a sensor attachment structure according to a fifth embodiment of the present invention is incorporated.
Figure 15:
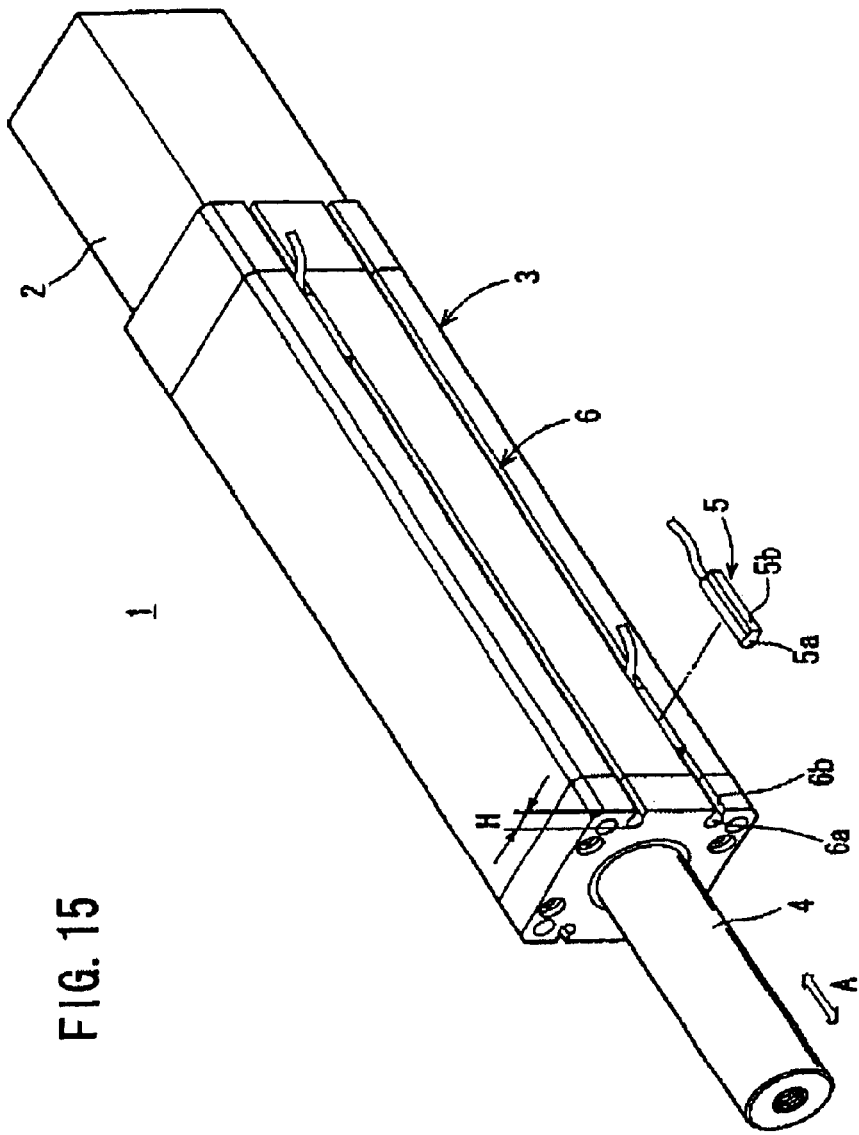
FIG. 15 is a schematic perspective view illustrating a conventional electric actuator.

Next, an electric actuator 102 which incorporates a sensor attachment structure 100 according to a fifth embodiment of the present invention will be described with reference to FIG. 14. The constituent elements that are identical to those of the sensor attachment structure 90 according to the fourth embodiment are labeled with the same reference numeral, and description thereof is omitted.

The sensor attachment structure 100 according to the fifth embodiment includes sheet-like magnetism-detecting sensors 104 and a communication chip 108 attached to an outer surface of an end block 106. Each of the magnetism-detecting sensors 104 is formed of a flexible board having a wireless communication capability for performing wireless communication with the communication chip 108. A connector 110 is attached to the end block 106. The connector 110 is connected to a power supply (not shown) through a lead wire for supplying power supply signals from the power supply to the communication chip 108.

Bi-directional wireless communication is performed between the magnetism-detecting sensors 104 and the communication chip 108 through a wireless LAN using BLUE-TOOTH technology, for example. Specifically, wireless power supply signals are supplied from the communication chip 108 to the magnetism-detecting sensors 104 through microwave communication, and detection signals (wireless signals) are supplied from the magnetism-detecting sensor 104 to the communication chip 108.

The magnetism-detecting sensors 104 may use ordinary batteries, solar cells or fuel cells, for example, instead of the power supply using the wireless technology. With the use of wireless power supply signals, it is not necessary to keep the connection between the magnetism-detecting sensors 104 and the power source all the time. The transmission of the signals is carried out as the need arises. The magnetism-detecting sensors 104 can be used in applications of a pneumatic cylinder or a hydraulic cylinder.

As described above, wireless communication is performed between the magnetism-detecting sensors 104 and the communication chip 108 without any lead wires. Therefore, wiring space, and wiring operation are not necessary, and the replacement of the magnetism-detecting sensor 104 can be carried out easily.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A sensor attachment structure of an actuator body for attaching a sensor for detecting a position of a movable section which is movable with respect to said actuator body under an action of an actuator, to a predetermined portion of said actuator body, said sensor attachment structure of said actuator body comprising:

said sensor, which comprises a flexible board formed to have a sheet-shaped configuration, said flexible board being flexible in a state when separated from said actuator body;

a sensor attachment recess which has a shape corresponding to said sheet-shaped flexible board and which is provided on a contour surface of said actuator body; and a sticking member which sticks said sensor to said sensor attachment recess, wherein said sensor is of a size that is sufficiently small in relation to said actuator body so that said sensor can be freely positioned at any of a plurality of positions in said sensor attachment recess by sticking said sensor to said sensor attachment recess.

2. The sensor attachment structure of said actuator body according to claim 1, wherein said sticking member is a strip-shaped sheet member which has sticky surfaces on both front and back sides thereof or which has a sticky surface on any one side thereof.

3. The sensor attachment structure of said actuator body according to claim 1, wherein:

a magnetism-generating source is provided for said movable section; and said sensor is a magnetism-detecting sensor.

4. The sensor attachment structure of said actuator body according to claim 3, wherein said magnetism-detecting sensor further comprises a communication chip, and wherein said flexible board comprises a wireless communication means for performing wireless communication with said communication chip.

5. The sensor attachment structure of said actuator body according to claim 4, wherein said wireless communication means enables bi-directional wireless communication to be performed between said magnetism-detecting sensor and said communication chip.

6. The sensor attachment structure of said actuator body according to claim 4, wherein wireless power supply signals are supplied from said communication chip to said magnetism-detecting sensor through microwave communication, and wireless detection signals are supplied from said magnetism-detecting sensor to said communication chip.

7. The sensor attachment structure of said actuator body according to claim 4, wherein said magnetism-detecting sensor is powered by one of batteries, solar cells or fuel cells.

8. A sensor attachment structure of an actuator body for attaching a sensor for detecting a position of a movable section which is movable with respect to said actuator body under an action of an actuator, to a predetermined portion of said actuator body, said sensor attachment structure of said actuator body comprising:

said sensor, which comprises a flexible board formed to have a sheet-shaped configuration, said flexible board being flexible in a state when separated from said actuator body; and a sticking member which directly sticks said sensor to a contour surface of said actuator body, wherein said sensor is of a size that is sufficiently small in relation to said actuator body so that said sensor can be freely positioned at any of a plurality of positions on said actuator body by sticking said sensor to said actuator body.

9. The sensor attachment structure of said actuator body according to claim 8, wherein said sticking member is a strip-shaped sheet member which has sticky surfaces on both front and back sides thereof or which has a sticky surface on any one side thereof.

10. The sensor attachment structure of said actuator body according to claim 8, wherein:

a magnetism-generating source is provided for said movable section; and said sensor is a magnetism-detecting sensor.

11. The sensor attachment structure of said actuator body according to claim 10, wherein said magnetism-detecting sensor further comprises a communication chip, and wherein said flexible board comprises a wireless communication means for performing wireless communication with said communication chip.

12. The sensor attachment structure of said actuator body according to claim 11, wherein said wireless communication means enables bi-directional wireless communication to be performed between said magnetism-detecting sensor and said communication chip.

13. The sensor attachment structure of said actuator body according to claim 11, wherein wireless power supply signals are supplied from said communication chip to said magnetism-detecting sensor through microwave communication, and wireless detection signals are supplied from said magnetism-detecting sensor to said communication chip.

14. The sensor attachment structure of said actuator body according to claim 11, wherein said magnetism-detecting sensor is powered by one of batteries, solar cells or fuel cells.

* * * * *